UNITED STATES PATENT OFFICE.

DAVID McCURDY, OF NEWARK, NEW JERSEY.

IMPROVEMENT IN THE MANUFACTURE OF INDIA-RUBBER.

Specification forming part of Letters Patent No. 8,016, dated April 1, 1851.

*To all whom it may concern:*

Be it known that I, DAVID MCCURDY, of Newark, in the county of Essex and State of New Jersey, have invented a certain new and useful Improvement in the Manner of Preparing and Compounding Caoutchouc or India-Rubber for Manufacture; and I hereby declare that the following is a full and exact description thereof.

My invention consists in the discovery of new ingredients to be mixed with india-rubber, which will cause a great improvement upon its strength and durability and contractile force, and overcome the difficulty hitherto resulting from the necessity of treating most fabrics of rubber with steam during the process of vulcanizing.

It is well known, generally stated, and I believe it to be true from my own extensive experiments, that under all modes of treatment hitherto known none has been discovered by which the change called "vulcanizing" could be produced by exposure to a heated atmosphere without the use of lead or its oxides or preparations, and the injurious effects of which have become so well and generally known that particular reference to all of them would be quite unnecessary. Fabrics of rubber combined with lead preparations become spoiled upon exposure to the sun and weather for a period varying from two to six months, when it becomes charred and loses its elastic properties. The ordinary exposure in the shade results in a bloom or white powder upon its surface, which renders articles thus made unsalable in the market. My experiments have resulted in the discovery that common commercial potash mixed with rubber in proportion as small as two ounces of potash to sixteen ounces of rubber, when treated by mixing of the usual quantity of sulphur—say from five to seven per cent., by weight—to the quantity of rubber used, will readily vulcanize upon exposure to a heated atmosphere, say 260° Fahrenheit. I find a tolerable good result can be obtained by the use of carbonate of potash, or soda and caustic potash, or caustic soda; but I prefer common commercial potash for its cheapness, and because it produces the best results. The quantity of potash may be increased. The exact amount is immaterial; but the best elasticity I obtain by the use of two ounces to sixteen ounces of rubber.

This preparation may be spread on fine figured or colored textile fabrics and exposed to a heated atmosphere without in the least discoloring or causing the loss of color to the fabric. It is free from offensive sulphur smell, and will not be affected by atmospheric changes.

For making my fabric harder and with less elasticity, as also for purposes of cheapness, I combine lime, whiting, paris-white, lampblack, and such articles as are well known to to give body and firmness to the rubber. These may be incorporated with the potash and rubber compound by the usual methods well known to manufacturers.

The mixture of sulphur is to be done as is usual in other preparations of rubber well known to rubber-manufacturers. I prefer to incorporate it while grinding the rubber. All my ingredients are to be incorporated and the rubber treated in the ordinary way known to manufacturers of vulcanized india-rubber.

Having described my invention and the best mode known to me of manufacturing the same, what I claim as my invention, and desire to secure by Letters Patent, is—

The combination of potash with rubber and sulphur, and submitting the same to a high degree of heat, whereby to produce the change upon rubber known as "vulcanizing."

DAVID McCURDY.

Witnesses:
D. WYCKOFF,
F. C. WAGNER.